US012705892B2

(12) United States Patent
Latapie et al.

(10) Patent No.: US 12,705,892 B2
(45) Date of Patent: Aug. 11, 2026

(54) EXPLAINABILITY FOR EVENT ALERTS IN VIDEO DATA

(71) Applicant: Cisco Technology, Inc., San Jose, CA (US)

(72) Inventors: Hugo Latapie, Long Beach, CA (US); Ozkan Kilic, Long Beach, CA (US); Adam James Lawrence, Pasadena, CA (US); Gaowen Liu, Austin, TX (US); Ramana Rao V. R. Kompella, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 441 days.

(21) Appl. No.: 17/971,268

(22) Filed: Oct. 21, 2022

(65) Prior Publication Data

US 2024/0135709 A1 Apr. 25, 2024
US 2024/0233377 A9 Jul. 11, 2024

(51) Int. Cl.
*G06V 20/40* (2022.01)
*G06V 20/52* (2022.01)
*G06V 40/10* (2022.01)

(52) U.S. Cl.
CPC .............. *G06V 20/44* (2022.01); *G06V 20/52* (2022.01); *G06V 40/10* (2022.01)

(58) Field of Classification Search
CPC ......... G06V 20/44; G06V 20/52; G06V 40/10
See application file for complete search history.

(56) References Cited

U.S. PATENT DOCUMENTS

| | | | |
|---|---|---|---|
| 10,887,197 | B2 | 1/2021 | Fenoglio et al. |
| 10,965,516 | B2 | 3/2021 | Fenoglio et al. |
| 11,336,506 | B1 | 5/2022 | Li et al. |
| 2005/0180603 | A1 | 8/2005 | Zoghlami et al. |
| 2008/0069482 | A1 | 3/2008 | Komiya |
| 2010/0322516 | A1 | 12/2010 | Xu et al. |
| 2011/0051992 | A1 | 3/2011 | Cobb et al. |
| 2012/0063641 | A1 | 3/2012 | Venkatesh et al. |
| 2013/0174116 | A1 | 7/2013 | Pfeifer |

(Continued)

FOREIGN PATENT DOCUMENTS

| | | | |
|---|---|---|---|
| WO | WO-2015027289 | A1 | 3/2015 |
| WO | WO-2019168323 | A1 | 9/2019 |
| WO | WO-2021251062 | A1 | 12/2021 |

OTHER PUBLICATIONS

Agrawal, et al., "VQA: Visual Question Answering", Proceedings of the IEEE International Conference on Computer Vision (ICCV), 2015, 25 pages, arXiv:1505.00468v7 [cs.CL].

(Continued)

*Primary Examiner* — Matthew C Bella
*Assistant Examiner* — Jinsu Hwang
(74) *Attorney, Agent, or Firm* — Lee & Hayes, P.C.

(57) ABSTRACT

In one embodiment, a device represents spatial characteristics over time of an object in video data as one or more timeseries. The device detects an event based on a rate of change of behavioral regimes associated with different portions of the one or more timeseries. The device selects contextual data for the event that comprises spatial timeseries information for different types of objects or different activities. The device provides an alert for the event to a user interface regarding the event that includes the contextual data.

18 Claims, 11 Drawing Sheets

(56) References Cited

U.S. PATENT DOCUMENTS

| | | | | |
|---|---|---|---|---|
| 2015/0186779 | A1 | 7/2015 | Deng et al. | |
| 2016/0105617 | A1 | 4/2016 | Kirkby et al. | |
| 2018/0033024 | A1 * | 2/2018 | Latapie | G06Q 30/0201 |
| 2020/0251091 | A1 | 8/2020 | Zhao | |
| 2020/0319715 | A1 | 10/2020 | Holz | |
| 2021/0042532 | A1 | 2/2021 | Latapie et al. | |
| 2021/0174155 | A1 | 6/2021 | Smith et al. | |
| 2021/0225409 | A1 | 7/2021 | Lawlor | |
| 2021/0258652 | A1 | 8/2021 | Li et al. | |
| 2021/0279615 | A1 | 9/2021 | Latapie et al. | |
| 2021/0312773 | A1 | 10/2021 | Debnath et al. | |
| 2021/0397849 | A1 | 12/2021 | Lin et al. | |
| 2023/0154204 | A1 * | 5/2023 | Kahn | B60W 30/0956 382/104 |

OTHER PUBLICATIONS

Ahmed, et al., "Reflection Detection in Image Sequences", CVPR 2011, Jun./Jul. 2011, 9 pages, IEEE, Colorado Springs, CO.

Aleksander, Igor, "Machine consciousness" In Scholarpedia. 3(2):4162, Oct. 21, 2011, 7 pages.

Anderson, et al., "Bottom-Up and Top-Down Attention for Image Captioning and Visual Question Answering", 2018 IEEE/CVF Conference on Computer Vision and Pattern Recognition, Jun. 2018, pp. 6077-6086, IEEE, Salt Lake City, Utah.

Baudrillard, Jean, "Simulacra and Simulation", 1981, 159 pages, Galilee.

Baz, et al., "Context-aware hybrid classification system for fine-grained retail product recognition", 2016 IEEE 12th Image, Video, and Multidimensional Signal Processing Workshop (IVMSP), Jul. 2016, 5 pages, IEEE, Bordeaux, France.

Bělohlávek, Radim, "Concept lattices and order in fuzzy logic", Annals of Pure and Applied Logic 128 (2004) 277-298, Elsevier.

Box, G. E. P., "Science and Statistics", In Journal of the American Statistical Association, 71(356), Dec. 1976, pp. 791-799.

Chalmers, David J., "The Conscious Mind: In Search of a Fundamental Theory", 1996, 433 pages, Oxford University Press, New York.

Chella, et al., "A cognitive framework for imitation learning", Robotics and Autonomous Systems 54, Mar. 2006, pp. 403-408, Elsevier.

Chella, et al., "Artificial Consciousness", Chapter 20, in Perception-Action Cycle, 2011, pp. 637-671, Springer, New York.

Chella, et al., "Machine Consciousness: A Manifesto for Robotics", in International Journal of Machine Consciousness, 1(1), Jun. 2009, pp. 33-51, World Scientific Publishing Company.

Cohen, Paul R., "Projections as Concepts", Computer Science Department Faculty Publication Series (194), https://scholarworks.umass.edu/cs/_faculty/_pubs/194, 1997, 6 pages, University of Massachusetts, Amherst.

Cui, et al., "A survey on network embedding", IEEE Transactions on Knowledge and Data Engineering, vol. 31, Issue: 5, May 1, 2019, pp. 833-852, IEEE.

D'Amour, et al., "Underspecification Presents Challenges for Credibility in Modern Machine Learning", Underspecification in Machine Learning, online: https://arxiv.org/pdf/2011.03395.pdf, Nov. 2020, 59 pages.

De Bono, Edward, "The Mechanism of Mind", 1967, 276 pages, Penguin Books.

Düntsch, et al., "Modal-style operators in qualitative data analysis", 2002 IEEE International Conference on Data Mining, 2002. Proceedings, Dec. 2002, pp. 155-162, IEEE, Maebashi City, Japan.

Franco, et al., "Grocery product detection and recognition", Expert Systems With Applications 81 (2017), pp. 163-176, Elsevier Ltd.

George, et al., "Recognizing Products: A Per-exemplar Multi-label Image Classification Approach", ECCV 2014, Part II, LNCS 8690, 2014, pp. 440-455, Springer International Publishing Switzerland.

Goertzel, et al., "CogPrime Architecture for Embodied Artificial General Intelligence", 2013 IEEE Symposium on Computational Intelligence for Human-like Intelligence (CIHLI), Apr. 2013, pp. 60-67, IEEE, Singapore.

Goertzel, Ben, "OpenCogPrime: A Cognitive Synergy Based Architecture for Artificial General Intelligence", 2009 8th IEEE International Conference on Cognitive Informatics, Jun. 2009, pp. 60-68, IEEE, Hong Kong, China.

Gorban, et al., "Blessing of dimensionality: mathematical foundations of the statistical physics of data", Philosophical Transactions of the Royal Society A: Mathematical, Physical and Engineering Sciences, 376.2118, Jan. 2008, 18 pages, The Royal Society Publishing.

Grover, et al., "node2vec: Scalable Feature Learning for Networks", KDD '16: Proceedings of the 22nd ACM SIGKDD International Conference on Knowledge Discovery and Data Mining, Aug. 2016, pp. 855-864, Association for Computing Machinery, New York, NY.

Hamilton, et al., "Representation Learning on Graphs: Methods and Applications", Bulletin of the IEEE Computer Society Technical Committee on Data Engineering, 2017, 23 pages, IEEE.

Hammer, et al., "A Reasoning Based Model for Anomaly Detection in the Smart City Domain", IntelliSys 2020, AISC 1251, pp. 144-159, 2021, Springer Nature Switzerland AG.

Hobbs, Jerry R., "Granularity", in Proceedings of the Ninth International Joint Conference on Artificial Intelligence, 1985, pp. 432-435, Morgan Kaufmann.

Horowitz, Alexandra, "Smelling themselves: Dogs investigate their own odours longer when modified in an "olfactory mirror" test", Behavioural Processes, 2017, 41 pages.

Johnson, Mark, "The Body in The Mind", 1987, 268 pages, The University of Chicago Press.

Jacob, et al., "A Demonstration of the Exathlon Benchmarking Platform for Explainable Anomaly Detection", Proceedings of the VLDB Endowment (PVLDB), Oct. 2021, 5 pages, HAL Open Science.

Kiryati, et al., "A probabilistic Hough transform", Pattern Recognition. 24(4), 1991, pp. 303-316, The Pattern Recognition Society.

Korzybski, Alfred, "Manhood of Humanity, The Science and Art of Human Engineering", 1921, 240 pages, E. P. Dutton & Company, New York, NY.

Korzybski, Alfred, "Science and Sanity: An Introduction to Non-Aristotelian Systems and General Semantics", 5th Edition, 1994, 910 pages, Institute of General Semantics, New York, NY.

Korzybski, Alfred, "Videos—This Is Not That", online: https://www.thisisnotthat.com/korzybski-videos/, accessed Nov. 18, 2021, 7 pages.

Lakoff, G., "Women, Fire, and Dangerous Things", 1984, 631 pages, University of Chicago Press.

Latapie, et al., "A Metamodel and Framework for Artificial General Intelligence from Theory to Practice", Journal of Artificial Intelligence and Consciousness, Feb. 12, 2021, 1:30, 24 pages, World Scientific Publishing Company.

Li, et al., "Concept learning via granular computing: A cognitive viewpoint", Information Sciences 298 (2015), Published Dec. 2014, pp. 447-467, Elsevier Inc.

Lieto, et al., "Conceptual Spaces for Cognitive Architectures: A Lingua Franca for Different Levels of Representation", Biologically Inspired Cognitive Architectures 19, May 2017, 17 pages, Cognitive Robotics and Social Sensing Lab.

Lin, et al., "Progressive Mirror Detection", 2020 IEEE/CVF Conference on Computer Vision and Pattern Recognition (CVPR), Jun. 2020, 9 pages, IEEE, Seattle, WA.

Ma, et al., "Granular computing and Dual Galois Connection", Information Sciences, 177(23), 2007, pp. 5365-5377, Elsevier Inc.

Macaulay, Thomas, "Facebook's chief AI scientist says GPT-3 is 'not a very good' Q&A system", online: https://thenextweb.com/news/facebooks-yann-lecun-says-gpt-3-is-not-very-good-as-a-qa-or-dialog-system, Oct. 28, 2020, accessed Nov. 18, 2021, 3 pages.

Murahari, et la., "Improving Generative Visual Dialog by Answering Diverse Questions", Proceedings of the 2019 Conference on Empirical Methods in Natural Language Processing and the 9th

(56) References Cited

OTHER PUBLICATIONS

International Joint Conference on Natural Language Processing, Nov. 2018, pp. 1449-1454, Association for Computational Linguistics, Hong Kong, China.
Park, et al., "Identifying Reflected Images from Object Detector in Indoor Environment Utilizing Depth Information", IEEE Robotics and Automation Letters, vol. 6, No. 2, Apr. 2021, pp. 635-642, IEEE.
Patel, et al., "Video Representation and Suspicious Event Detection Using Semantic Technologies", online: http://semantic-web-journal.net/system/files/swj2427.pdf, Semantic Web 0, Sep. 10, 2020, accessed Aug. 9, 2021, 25 pages, IOS Press.
Pauli, Wolfgang, "Part I. General: (A) theory. Some relations between electrochemical behaviour and the structure of colloids", Jan. 1935, pp. 11-27, Transactions of the Faraday Society, vol. 1.
Scarselli, et al., "The Graph Neural Network Model", IEEE Transactions on Neural Networks (vol. 20, Issue: 1, Jan. 2009), pp. 61-80, IEEE.
Speer, et al., "ConceptNet 5.5: An Open Multilingual Graph of General Knowledge", online: https://arxiv.org/pdf/1612.03975.pdf, 2017, 9 pagers, Association for the Advancement of Artificial Intelligence.
Swanson, Bret, "The Exponential Internet", online: https://www.uschamberfoundation.org/bhq/exponential-internet, accessed Nov. 19, 2021, 8 pages, The U.S. Chamber of Commerce Foundation.
Tan, et al., "EfficientDet: Scalable and Efficient Object Detection", online: https://arxiv.org/pdf/1911.09070.pdf, Jul. 2020, 10 pages.
Taylor, J. G., "CODAM: A neural network model of consciousness", Neural Networks 20 (2007), pp. 983-992, Elsevier Ltd.
Thórisson, et al., "Cumulative Learning", Artificial General Intelligence—12th International Conference, AGI 2019, Proceedings, pp. 198-208, Springer.
Thórisson, Kristinn R., "A New Constructivist AI: From Manual Methods to Self-Constructive Systems", Chapter 9, Apr. 2012, pp. 147-174, Atlantis Press Book.
Thorisson, Kristinn R., "Integrated AI Systems", Minds & Machines 17, Mar. 2007, pp. 11-25.
Tonioni, et al., "Product recognition in store shelves as a sub-graph isomorphism problem", online: https://arxiv.org/abs/1707.08378, Sep. 2017, 14 pages.
Tripathy, et al., "Explaining Anomalies in Industrial Multivariate Time-Series Data with the Help of eXplainable AI", 2022 IEEE International Conference on Big Data and Smart Computing (BigComp), Jan. 2022, 8 pages, IEEE, Republic of Korea.
Unger, et al., "The Singular Universe and the Reality of Time: A Proposal in Natural Philosophy", 2015, 558 pages, Cambridge University Press.
Unger, R. M. 2014. "Roberto Unger: Free Classical Social Theory from Illusions of False Necessity", Online Lecture. 45 pages Retrieved on Nov. 22, 2021 from https://www.youtube.com/watch?v=yYOOwNRFTcY.
Wang, et al., "Concept Analysis via Rough Set and AFS Algebra", Information Sciences 178 (2008), pp. 4125-4137, Elsevier Inc.
Wang, Pei, "Experience-grounded semantics: a theory for intelligent systems", Aug. 2004, 33 pages, Elsevier Science.
Wang, Pei, "Insufficient Knowledge and Resources—A Biological Constraint and Its Functional Implications", Biologically Inspired Cognitive Architectures II: Papers from the AAAI Fall Symposium (FS-09-01), 2009, pp. 188-193, Association for the Advancement of Artificial Intelligence (www.aaai.org).
Wang, Pei, "Non-axiomatic logic (nal) specification", online: http://citeseerx.ist.psu.edu/viewdoc/download?doi=10.1.1.167.2069&rep=rep1&type=pdf, Oct. 2009, 88 pages.
Wang, Pei, "On Defining Artificial Intelligence", Journal of Artificial General Intelligence 10(2) 2019, pp. 1-37, Sciendo.
Wang, et al. "Self in NARS, an AGI System", vol. 5, Article 20, Mar. 2018, 15 pages, Frontiers in Robotics and AI.
Wang, et al., "SuperGLUE: A Stickier Benchmark for General-Purpose Language Understanding Systems", online: https://arxiv.org/pdf/1905.00537.pdf, 2019, 29 pages, 33rd Conference on Neural Information Processing Systems (NeurIPS 2019), Vancouver, Canada.
Wikipedia, "Wheat and chessboard problem", online: https://en.wikipedia.org/wiki/Wheat_and_chessboard_problem, Oct. 2021, 5 pages, Wikimedia Foundation, Inc.
Wille, Rudolf, "Restructuring Lattice Theory: An Approach Based on Hierarchies of Concepts", I. Rival (Ed.), Ordered Sets, 1982, pp. 314-339.
Xue, et al., "Real-Time Anomaly Detection and Feature Analysis Based on Time Series for Surveillance Video", IEEE 5th International Conference on Universal Village . UV2020 . Session 3ABD-7, Oct. 2020, 7 pages, IEEE, Boston, MA.
Yao, et al., " A Granular Computing Paradigm for Concept Learning", Emerging Paradigms in Machine Learning, Springer, London, pp. 307-326, 2012.
Yao, Y. Y., "Information Granulation and Rough Set Approximation", International Journal of Intelligent Systems, vol. 16, No. 1, 87-104, 2001.
Yao, Y. Y., "Integrative levels of granularity", Human-Centric Information Processing Through Granular Modelling, 2009, 20 pages, Studies in Computational Intelligence, vol. 182. Springer, Berlin, Heidelberg.
Ying, et al., "Graph convolutional neural networks for web-scale recommender systems", online: https://arxiv.org/pdf/1806.01973.pdf, In KDD '18: The 24th ACM SIGKDD International Conference on Knowledge Discovery & Data Mining, Aug. 19-23, 2018, London, United Kingdom. ACM, New York, NY, USA, 10 pages.
Zhou, et al., "Graph neural networks: A review of methods and applications", AI Open, 2020, pp. 57-81, Elsevier B.V.
Zhu, et al., "Describing Unseen Videos via Multi-modal Cooperative Dialog Agents" Computer Vision—ECCV 2020, 17 pages, Lecture Notes in Computer Science, vol. 12368. Springer.

* cited by examiner

400

410

EXPLAINABILITY FOR EVENT ALERTS IN VIDEO DATA

TECHNICAL FIELD

The present disclosure relates generally to computer networks, and, more particularly, to explainability for event alerts in video data.

BACKGROUND

Video analytics techniques are becoming increasingly ubiquitous as a complement to new and existing surveillance systems. For instance, person detection and reidentification now allows for a specific person to be tracked across different video feeds throughout a location. More advanced video analytics techniques also attempt to detect certain types of events, such as a person leaving a suspicious package in an airport.

Traditionally, event detection within video feeds has relied on object detection and training a model to recognize a particular type of event using a large body of examples. Unfortunately, this means that there needs to be a sufficient training dataset of examples of the type of event to be detected, which can be challenging, especially in the case of rare events. In addition, such an approach is also unable to detect and adapt to new types of events of interest.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
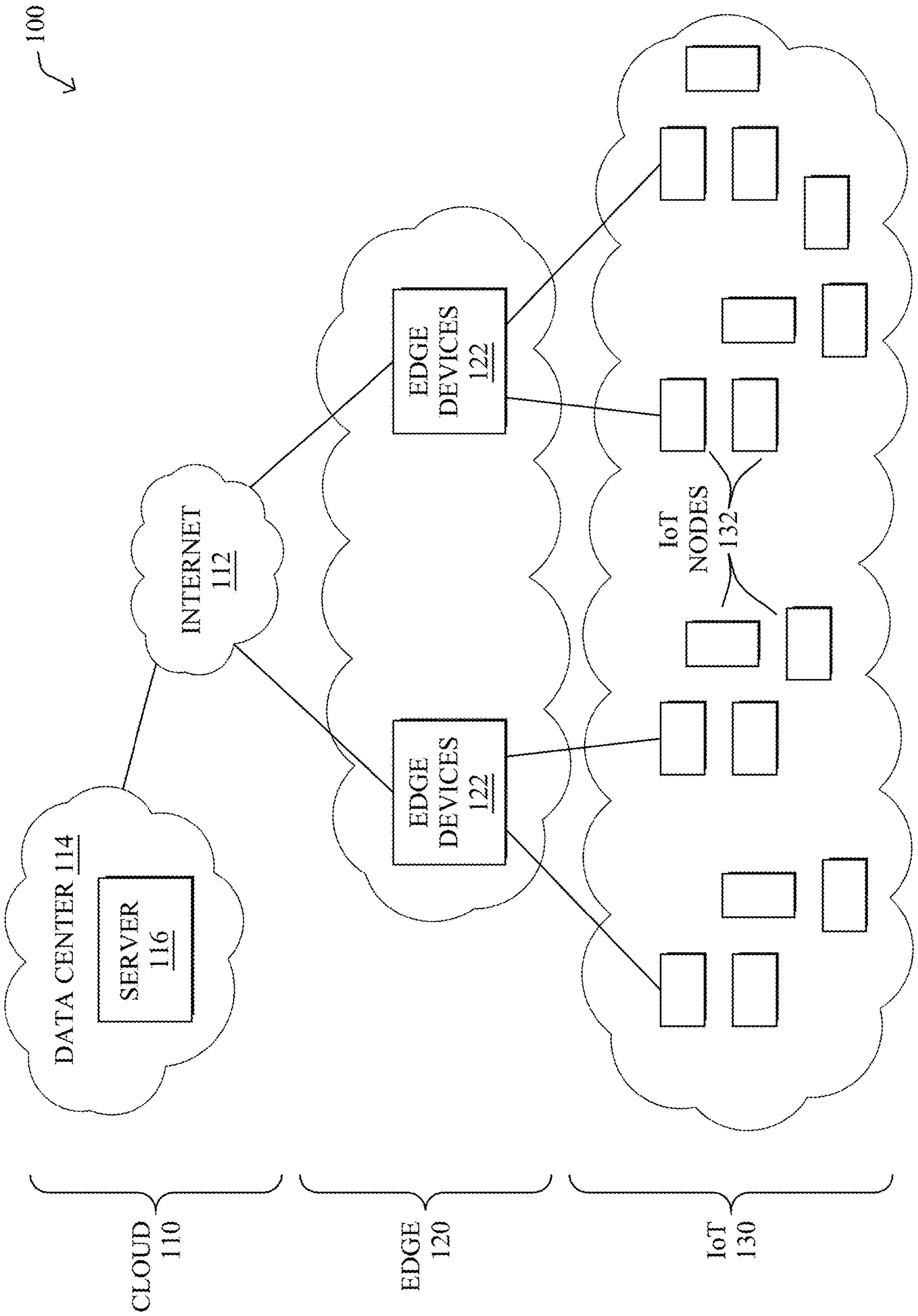
FIG. 1 illustrate an example network.

According to one or more embodiments of the disclosure, a device represents spatial characteristics over time of an object in video data as one or more timeseries. The device detects an event based on a rate of change of behavioral regimes associated with different portions of the one or more timeseries. The device selects contextual data for the event that comprises spatial timeseries information for different types of objects or different activities. The device provides an alert for the event to a user interface regarding the event that includes the contextual data.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or wired networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing, also sometimes referred to as "fog" computing, is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to IoT endpoints to provide computing, storage, and networking resources and services. Multiple edge nodes organized or configured together form an edge compute system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, wired links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, edge layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the edge layer 120, various edge devices 122 may perform various data processing functions locally, as opposed to datacenter/cloud-based servers or on the endpoint IoT nodes 132 themselves of IoT device layer 130. For example, edge devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), or other shared-media protocols where appropriate. In this context, a protocol consists of a set of rules defining how the nodes interact with each other.

Figure 2:
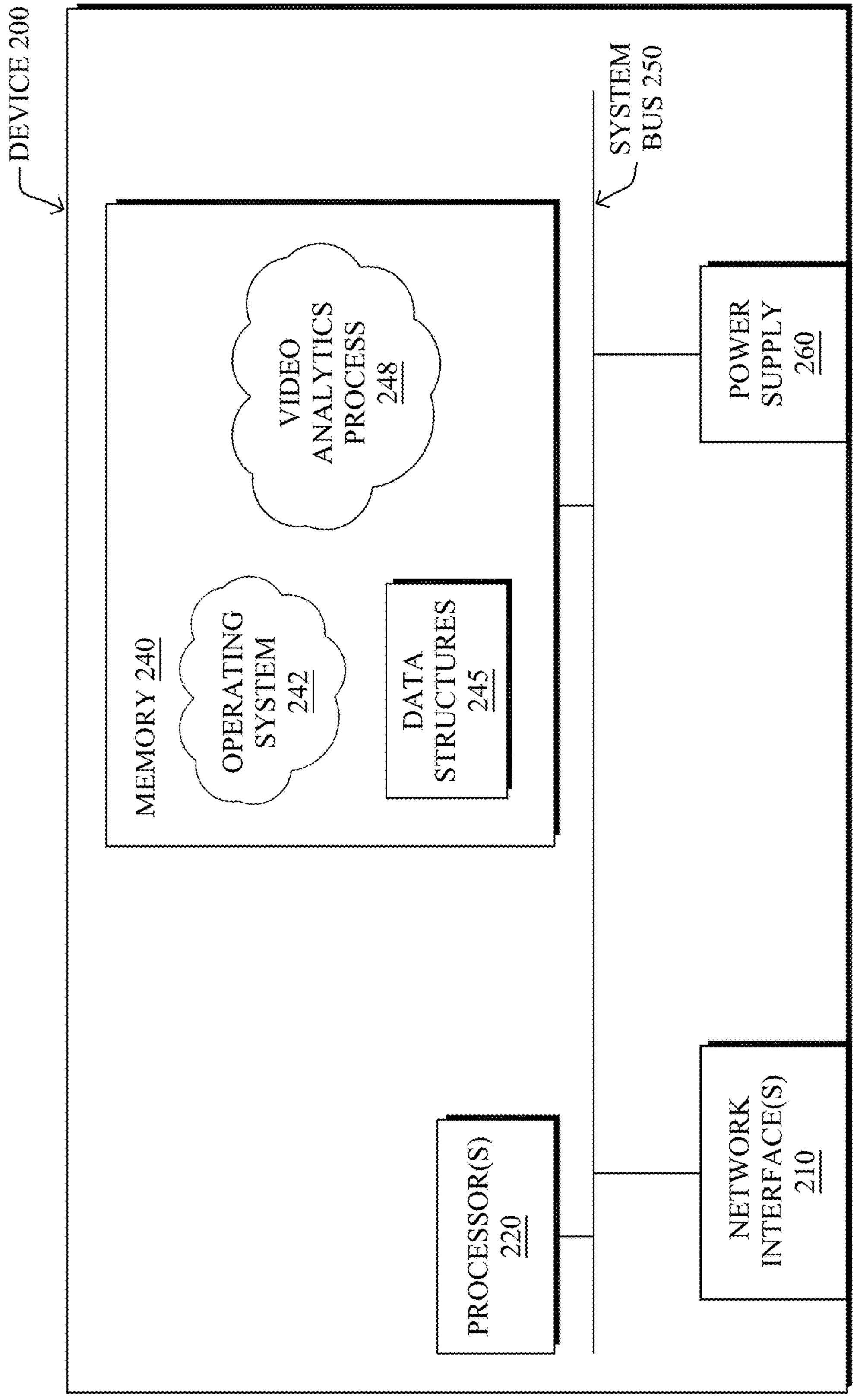
FIG. 2 illustrates an example network device/node.

FIG. 2 is a schematic block diagram of an example node/device 200 (e.g., an apparatus) that may be used with one or more embodiments described herein, e.g., as any of the nodes or devices shown in FIG. 1 above or described in further detail below. The device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative video analytics process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In various embodiments, video analytics process 248 may employ one or more supervised, unsupervised, or self-supervised machine learning models. Generally, supervised learning entails the use of a training set of data that is used to train the model to apply labels to the input data. For example, the training data may include sample video data depicting a particular event that has been labeled as such. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Self-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

Figure 3:
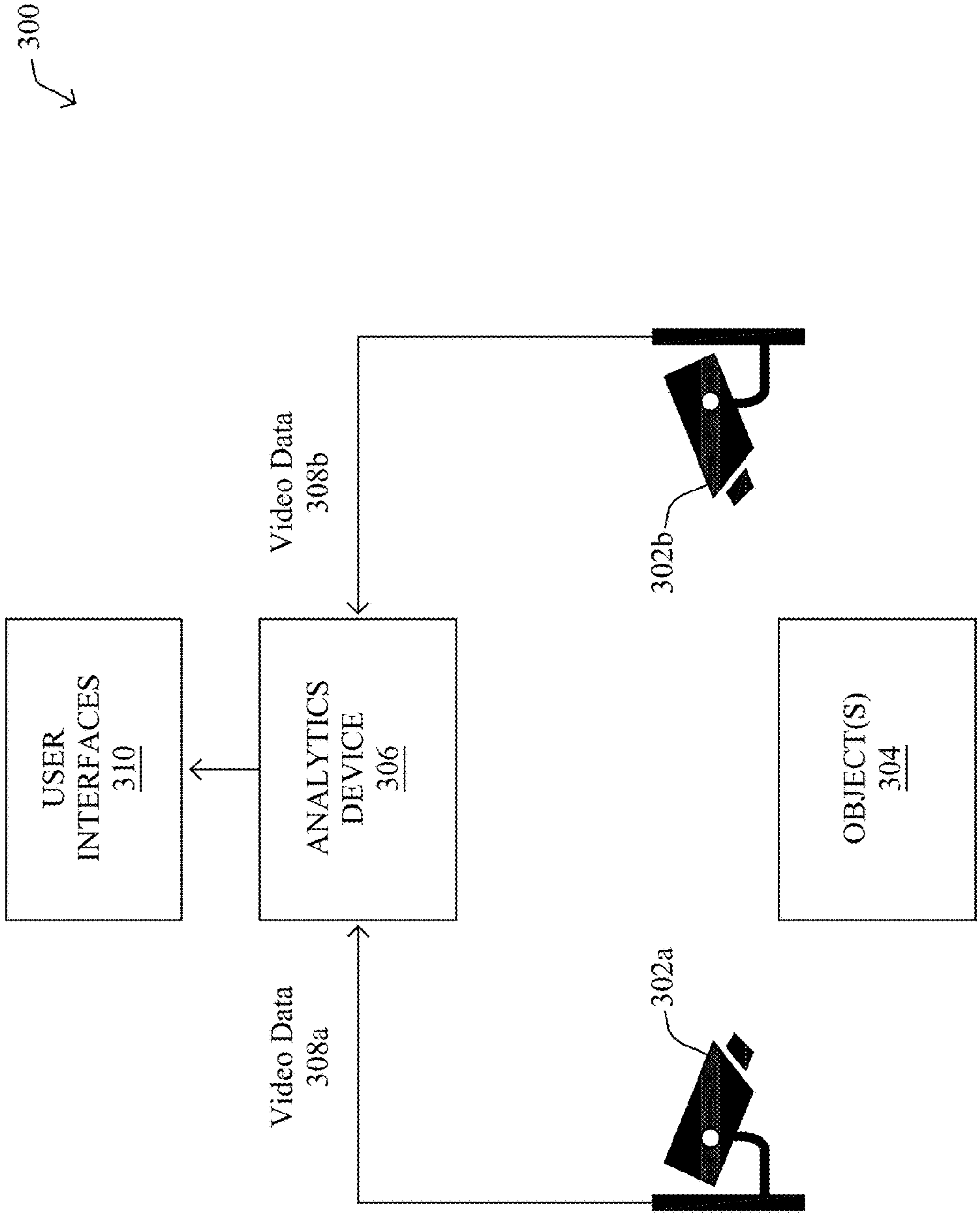
FIG. 3 illustrates an example system for performing video analytics.

FIG. 3 illustrates an example system 300 for performing video analytics, as described in greater detail above. As shown, there may be any number of cameras 302 deployed to a physical area, such as cameras 302*a*-302*b*. Such surveillance is now fairly ubiquitous across various locations including, but not limited to, public transportation facilities (e.g., train stations, bus stations, airports, etc.), entertainment facilities (e.g., sports arenas, casinos, theaters, etc.), schools, office buildings, and the like. In addition, so-called "smart" cities are also now deploying surveillance systems for purposes of monitoring vehicular traffic, crime, and other public safety events.

Regardless of the deployment location, cameras 302*a*-302*b* may generate and send video data 308*a*-308*b*, respectively, to an analytics device 306 (e.g., a device 200 executing video analytics process 248 in FIG. 2). For instance, analytics device 306 may be an edge device (e.g., an edge device 122 in FIG. 1), a remote server (e.g., a server 116 in FIG. 1), or may even take the form of a particular endpoint in the network, such as a dedicated analytics device, a particular camera 302, or the lie.

In general, analytics device 306 may be configured to provide video data 308*a*-308*b* for display to one or more user interfaces 310, as well as to analyze the video data for events that may be of interest to a potential user. To this end, analytics device 306 may perform object detection on video data 308*a*-308*b*, to detect and track any number of objects 304 present in the physical area and depicted in the video data 308*a*-308*b*. In some embodiments, analytics device 306 may also perform object re-identification on video data 308*a*-308*b*, allowing it to recognize an object 304 in video data 308*a* as being the same object in video data 308*b* or vice-versa.

As noted above, a key challenge with respect to video analytics is the detection of events that may be of relevance to a user. Traditional efforts to detect relevant events in captured video have focused on supervised learning, which requires a training dataset of labeled examples, in order to train a model. For instance, consider the example of two vehicles colliding with one another. In order to detect this event from the captured video data, hundreds or even thousands of example video clips depicting vehicular collisions that have been labeled as such. While this approach can result in a model that is able to detect vehicular collisions under certain circumstances, it also suffers from multiple disadvantages:

1. The training process can be quite cumbersome—In addition to requiring many labeled examples of a particular type of event, which may not even be available, this approach also requires this to be repeated for each type of event to be detected.
2. The trained model is unlikely to detect and adapt to new types of events of interest—For instance, say the model was trained to detect vehicular collisions using training data only showing two cars colliding. However, after deployment, the video data analyzed by the model may depict any number of different types of vehicles (e.g., bicycles, motorcycles, busses, etc.). Consequently, the model may not be able to detect collisions between other types of vehicles that were not included in its training data.

According to various embodiments, the techniques herein propose using a self-supervised learning approach to detect events in video data that may be of interest to a user. In some aspects, this can be done by first representing the spatial characteristics of the various objects detected in the video as timeseries. By doing so, different behavioral regimes can be detected within the timeseries that correspond to different behaviors/activities of the object under analysis. Then, by assessing the rate of change (e.g., the derivative) of the regime changes, the video analytics system can identify events that may be of interest to a user and raise alerts, accordingly.

More specifically, rather than video analytics process 248 being configured to detect a particular type of event in video data from one or more cameras, the techniques herein propose that it be configured to do the following:

1. First, represent the video stream(s) as a set of spatial timeseries; and
2. Analyzing those timeseries to detect regime changes In various embodiments, video analytics process 248 may begin by employing object (re)identification, to track the various object(s) depicted in the video data over time. For instance, a detected object may be any of the following, among others: a person, a vehicle, a package, a suitcase or other portable object, or the like. In some embodiments, video analytics process 248 may also identify a collection of multiple physical objects as a singular object for purposes of tracking an analysis.

Figure 4A:
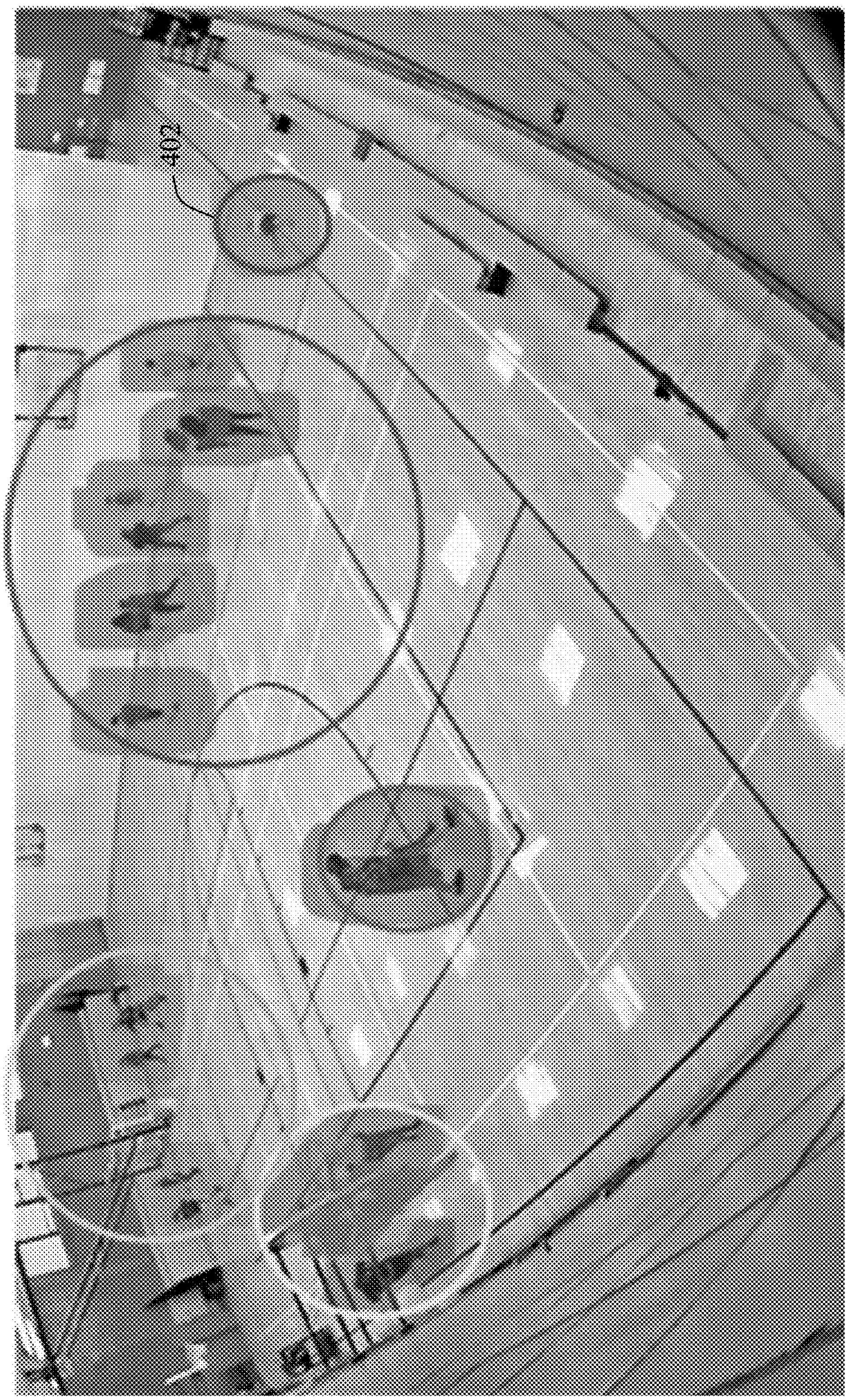
FIGS. 4A-4B illustrate examples of the analysis of different frames of a video feed.
Figure 4B:
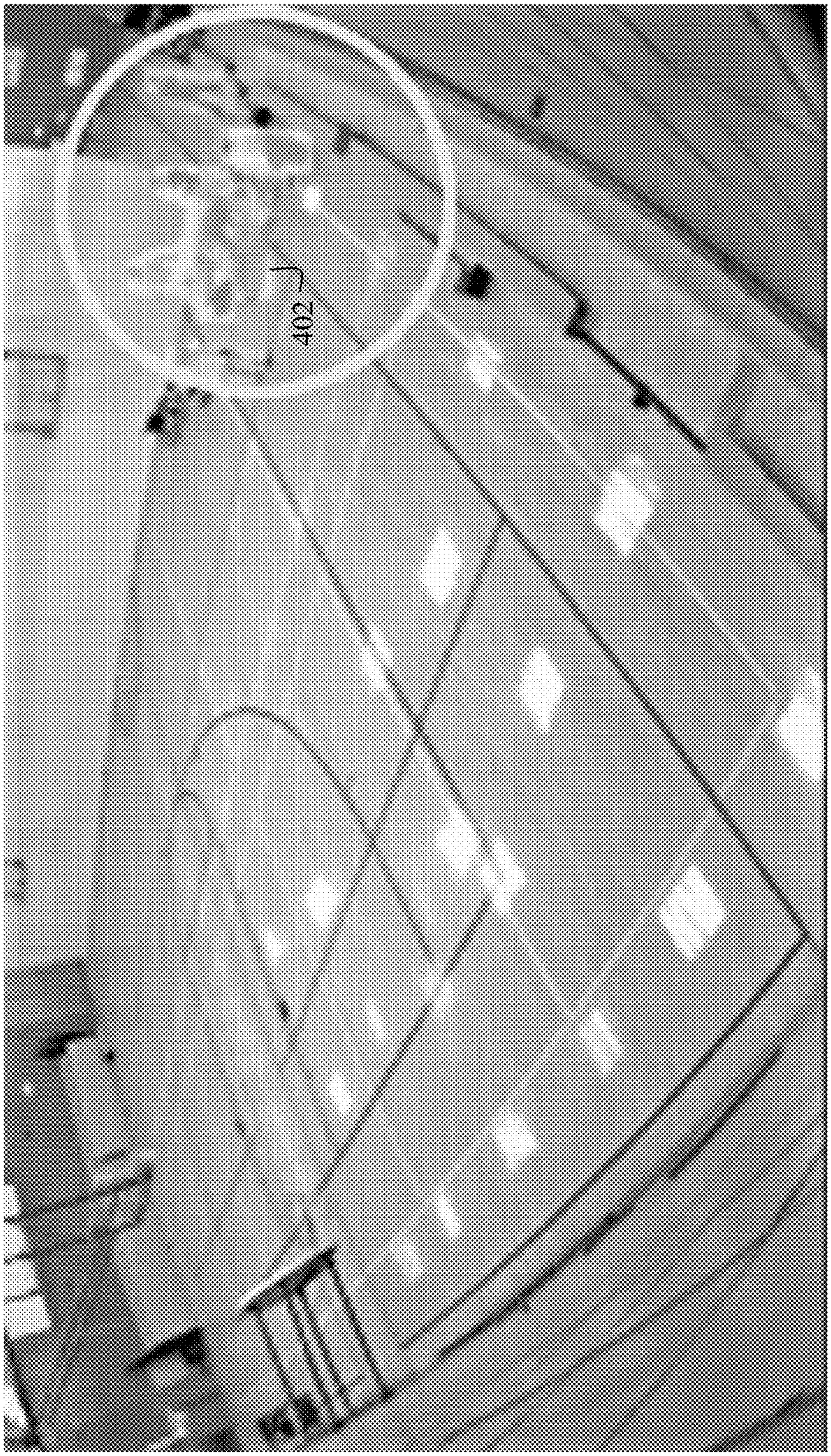

By way of example, FIGS. 4A-4B illustrate different frames 400, 410, respectively, of a video stream from a camera. As shown in FIG. 4A, video analytics process 248 may detect and track different people present in the physical location using a person (re)identification mechanism. Each detected person is shown in frame 400 as highlighted. In addition, video analytics process 248 may also detect clusters of people as separate objects for analysis, each of which is shown in frame 400 as circled.

In various embodiments, video analytics process 248 may, for any or all of the identified objects in the video data, compute their spatial characteristics. For instance, video analytics process 248 may compute the centroid of a certain object, its two-dimensional or three-dimensional coordinates, its shape, its kinematics information, its relative position and/or trajectory with respect to one or more other object(s), the constituent members of a cluster object, or other information regarding the characteristics of the object.

Generally, each timeseries computed by video analytics process 248 represents the spatial characteristics of its associated object (e.g., a singular object or cluster of objects) over time. A key observation herein is that different activities/behaviors performed by the object under analysis will also be reflected in its corresponding timeseries as a distinguishable pattern. For instance, the timeseries for a person standing relatively still for a period of time in the video data will be relatively constant. Conversely, a person playing basketball may have wide variations in their timeseries, as they transition between running, stopping, dribbling the ball, shooting the ball, etc. Each timeseries pattern is referred to herein as a "behavioral regime" as it corresponds to a different activity being performed by the object.

According to various embodiments, video analytics process 248 may detect events of interest in the video data based on the rate of regime changes of the object(s) under analysis. While it may be possible to simply apply anomaly detection to a timeseries to detect anomalous events, doing so could also inadvertently flag regime changes as anomalous, despite them being perfectly normal activities. For instance, as noted above, the spatial timeseries of a person running and then shooting a basketball may exhibit a regime change which might be viewed as anomalous by a traditional anomaly detector. Instead, video analytics process 248 may look to the rate of regime change of the one or more object(s), to identify events that may be of interest.

By way of example, as shown in FIG. 4A, assume that a player 402 has suddenly collapsed on the basketball court, indicating a potential medical emergency. In such a case, the timeseries of the player exhibit a very sudden regime change, due to the player going from running to laying down. This may be of particular interest when compared to that of the other objects, as the other players may not have initially noticed the collapsed player 402.

In addition, as shown in FIG. 4B, the spatial timeseries of the other objects will also exhibit rapid regime changes, as the other players begin to notice the collapsed player 402. Here, the other players may go from behavioral regimes corresponding to running, dribbling, etc. to standing around the collapsed player 402. From the perspective of the cluster objects, this also corresponds to a sudden merging of clusters of people into a singular cluster around the collapsed player 402.

In various embodiments, to analyze the rate of regime changes in the timeseries, in some embodiments, video analytics process 248 may compute the derivatives of the timeseries and compare them to one or more threshold values. Thus, if the derivative of the timeseries exceeds such a threshold, this may indicate a rapid transition to a new regime, which could then be reported to a user interface as an event of interest.

Figure 5:
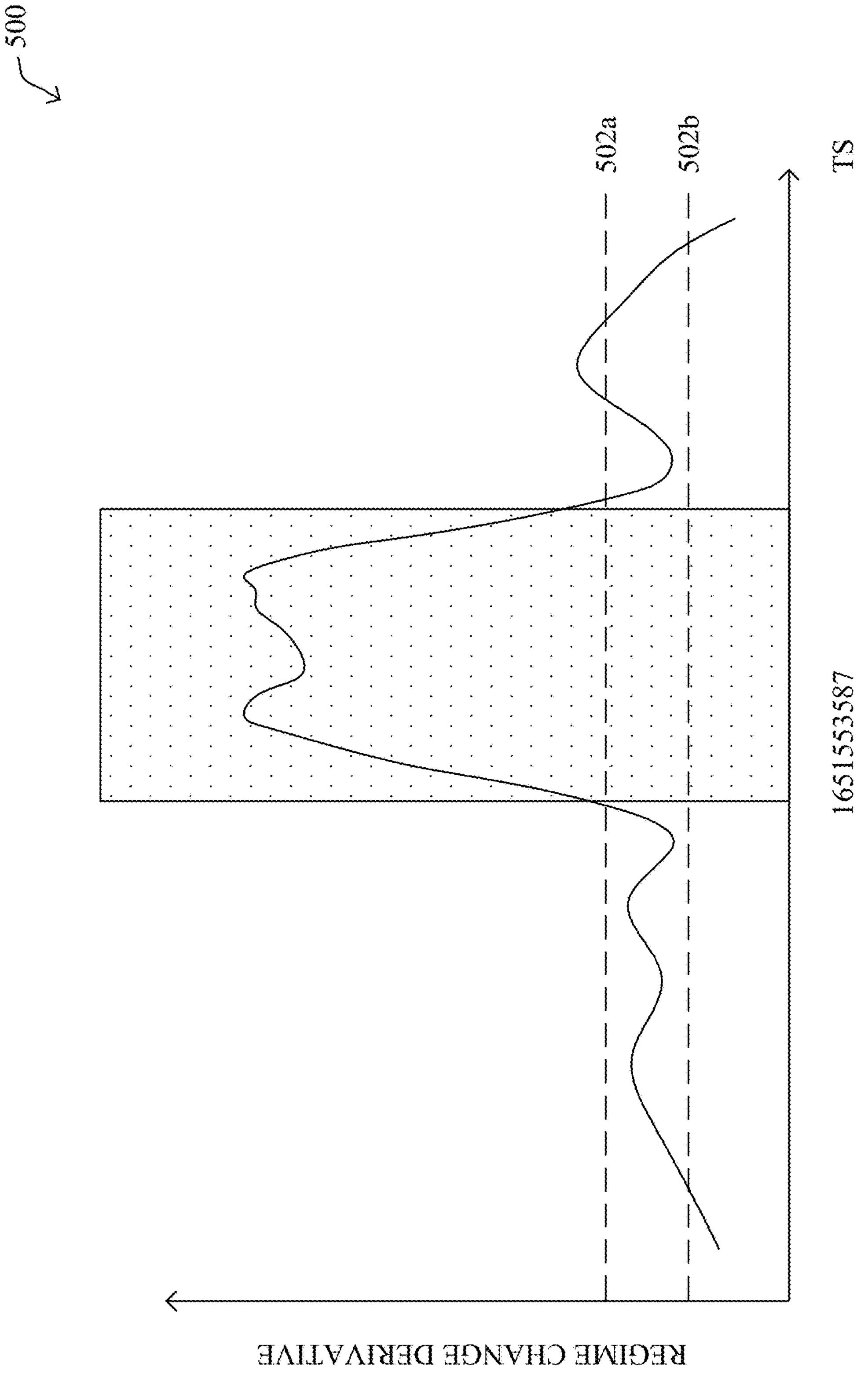
FIG. 5 illustrates an example plot of the regime change derivative for a timeseries.

For instance, FIG. 5 illustrates an example plot 500 of the regime change derivative for a timeseries, according to various embodiments. As shown, assume that there exists a baseline range between thresholds 502*a*-502*b* for the regime change derivative of a particular timeseries over time (e.g., a timeseries labeled with the identifier '1651553587'), such as for the player 402 shown in FIGS. 4A-4B. In such a case, when the regime change derivative exceeds threshold 502*a*, such as due to the player suddenly collapsing, video analytics process 248 may deem this an event of interest and raise an alert to a user interface for further review. Such thresholds may be set manually, based on a percentile or other distribution of values, or the like.

As would be appreciated, this approach does not require training a model to detect any specific type of event, but instead looks at the dynamics of the regime changes of the objects, to detect events that may be of interest. Thus, the techniques herein may be able to raise alerts as to new types of events and other scenarios that may be of interest, even without prior training regarding them.

Figure 6:
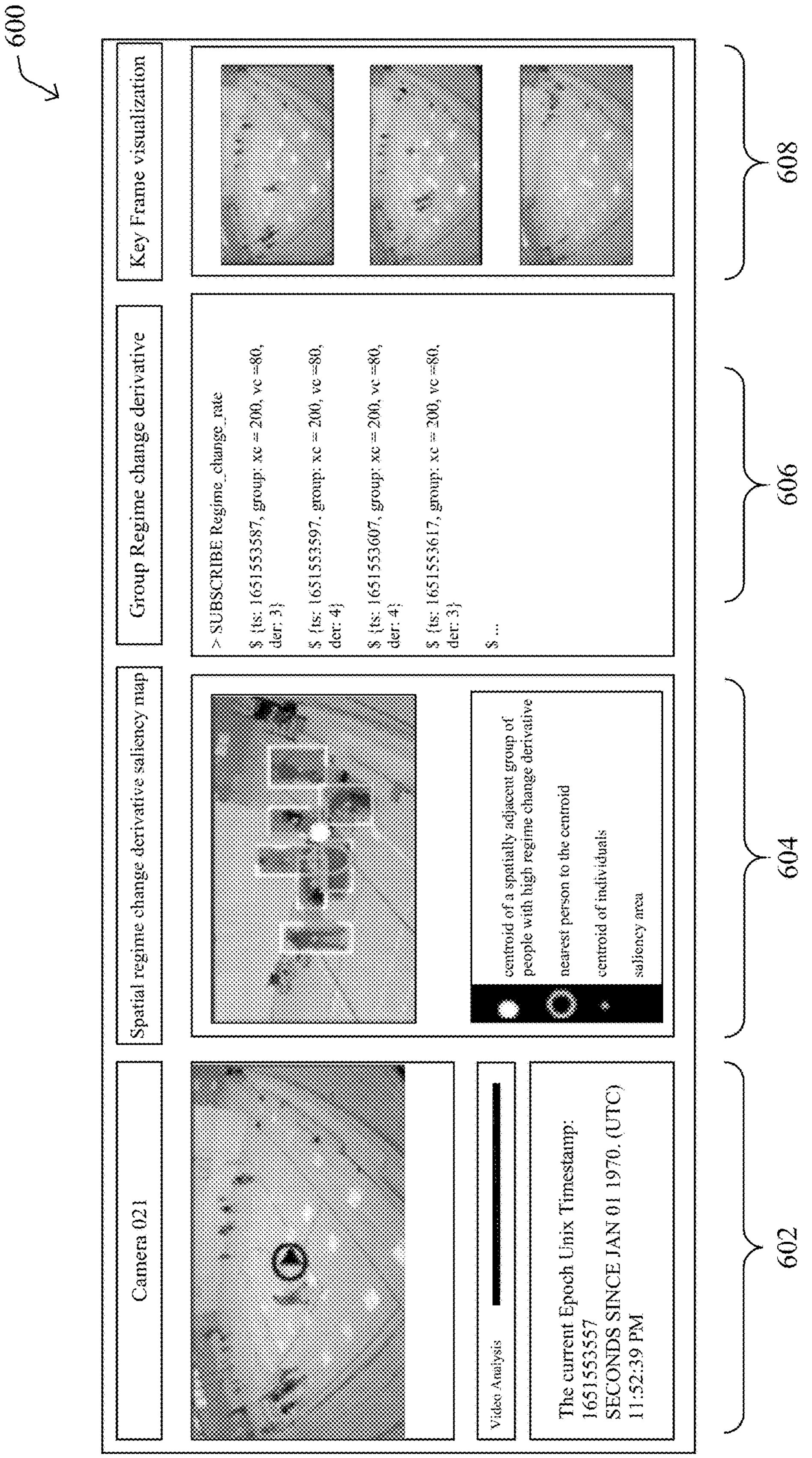
FIG. 6 illustrates an example user interface showing an event alert.

FIG. 6 illustrates an example user interface 600 showing a regime change alert that video analytics process 248 may provide to a user interface, in some embodiments. Continuing the prior examples in FIGS. 4A-4B, assume now that video analytics process 248 has determined that the rate of behavioral regime change for one or more of the spatial timeseries exceeded a threshold, it may raise an alert for display by user interface 600.

By way of example, as part of the raised alert, user interface 600 may display at least a portion of the video data associated with the alert, such as a video clip portion 602 and/or selected frames 608 from the video. In some instances, portion 602 and/or selected frames 608 may also include timestamp information, so that the user is able to quickly understand the temporal aspects of the event.

As shown, user interface 600 may also display as part of the alert spatial regime change derivative information that led to the alert. For instance, this may include the raw regime change derivative values 606 over time for a particular object or object group. In further cases, user interface 600 may also display the information as an overlay for a frame or video clip. For instance, user interface 600 may display portion 604 that includes a frame showing the collapsed player with overlays highlighting the various people in the area, their centroids, the centroid of the group of people, the nearest person to the centroid, or the like.

One observation herein is that while self-supervised learning can be used to detect events of interest in a more robust and simplified way, there may be situations in which the alerted user is unable to immediately understand why an alert was raised. Indeed, while an event may be anomalous from an analytics standpoint, without any explanation, it may be difficult for the user to discern why the event was raised in the first place.

Explainability for Event Alerts in Video Data

The techniques herein introduce mechanisms that provide additional context data in conjunction with an event alert raised by a video analytics system. In some aspects, the techniques herein propose augmenting a self-supervised learning system by identifying contextual information that may help a user better understand a detected event, such as spatial timeseries information for different types of objects or actions.

Illustratively, the techniques described herein may be performed by hardware, software, and/or firmware, such as in accordance with the video analytics process 248, which may include computer executable instructions executed by the processor 220 (or independent processor of interfaces 210), to perform functions relating to the techniques described herein.

Specifically, according to various embodiments, a device represents spatial characteristics over time of an object in video data as one or more timeseries. The device detects an event based on a rate of change of behavioral regimes associated with different portions of the one or more timeseries. The device selects contextual data for the event that comprises spatial timeseries information for different types of objects or different activities. The device provides an alert for the event to a user interface regarding the event that includes the contextual data.

Operationally, the techniques herein further propose identifying and presenting contextual information with an event detected using the self-supervised approach described above. More specifically, an observation herein is that the anomaly thresholds for an object typically differ, based on the type of object and/or its actions. For instance, consider the case in which the object is a person. In such a case, the spatial characteristics of the person may differ depending on whether the person is a baby, a toddler, a teenager, an adult, elderly, sickly, or other demographic information.

Figure 7A:
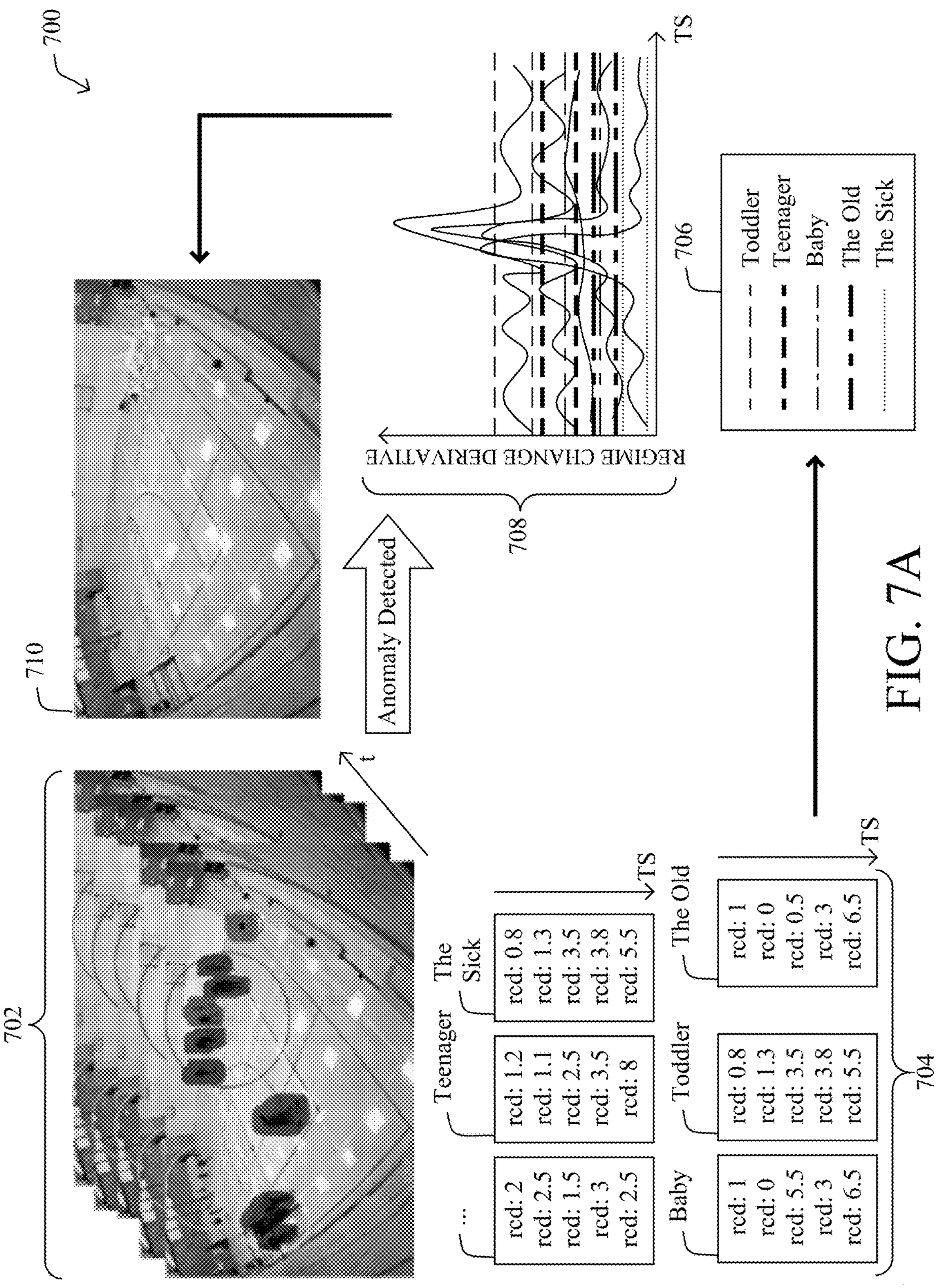
FIGS. 7A-7B illustrate examples of identifying contextual information for a detected event.
Figure 7B:
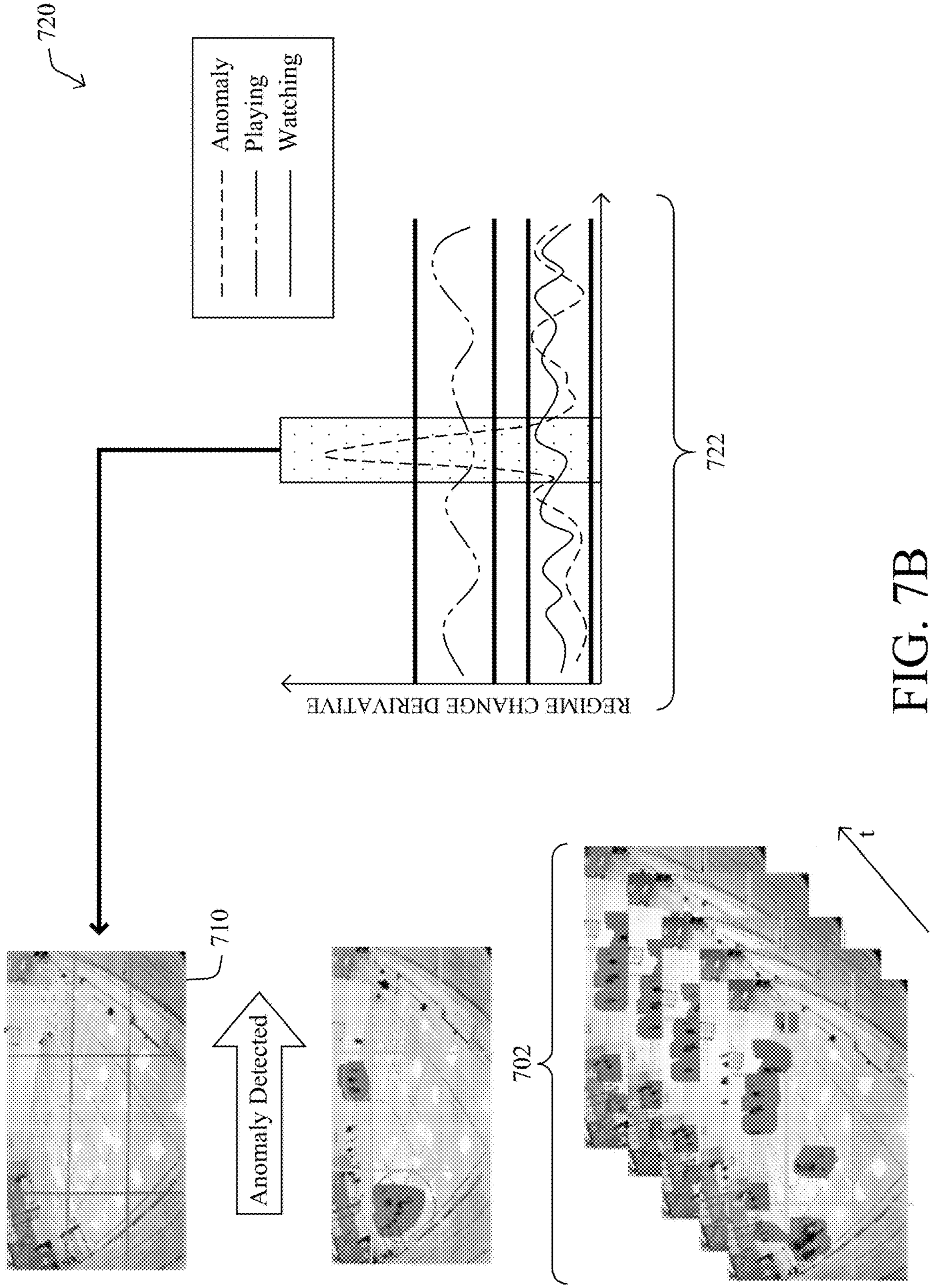

FIGS. 7A-7B illustrate examples of identifying contextual information for a detected event, in various embodiments. As shown in example 700 in FIG. 7A, consider the case in which video analytics process 248 receives video data 702 comprising a series of sequential video frames over time. In turn, video analytics process 248 may track the various objects depicted in video data 702, compute their spatial timeseries, and compute a set 704 of regime change derivatives (denoted "rcd") for these timeseries. Using the techniques described previously, video analytics process 248 may then analyze set 704 over time, to detect any anomalous events.

In various embodiments, once video analytics process 248 has detected an anomalous event that may be of interest to a user, it may select contextual data 706 for the detected event. For instance, as shown, contextual information 706 may include different anomaly thresholds for people with different demographics (e.g., a toddler, a teenager, a baby, the old, the sick, etc.). In turn, video analytics process 248 may generate display data 708 that includes the contextual data 706. For instance, display data 708 may take the form of the plot(s) of the regime change derivatives of the various object(s) in video data 702 over time and the thresholds for different demographics overlaid. In turn, video analytics process 248 may raise an event alert that includes an image 710 associated with the event, as well as display data 708 that shows the contextual data 706.

FIG. 7B illustrates another example 720 of video analytics process 248 identifying contextual information for a detected anomalous event. Similar to FIG. 7A, video analytics process 248 may analyze video data 702 and detect an anomalous event based on the regime change derivatives of the spatial timeseries for the different objects in video data 702. Here, in some embodiments, video analytics process 248 may also generate display data 722 that includes contextual information for the different activities of the objects. For instance, the two primary activities that may be represented in video data 702 are 'playing' and 'watching,' each having their own anomaly thresholds with respect to their corresponding regime change derivative plots. By including display data 722 in conjunction with image 710 as part of an event alert, this allows the user to quickly determine that the person that collapsed was likely watching the other players, prior to collapsing.

Figure 8:
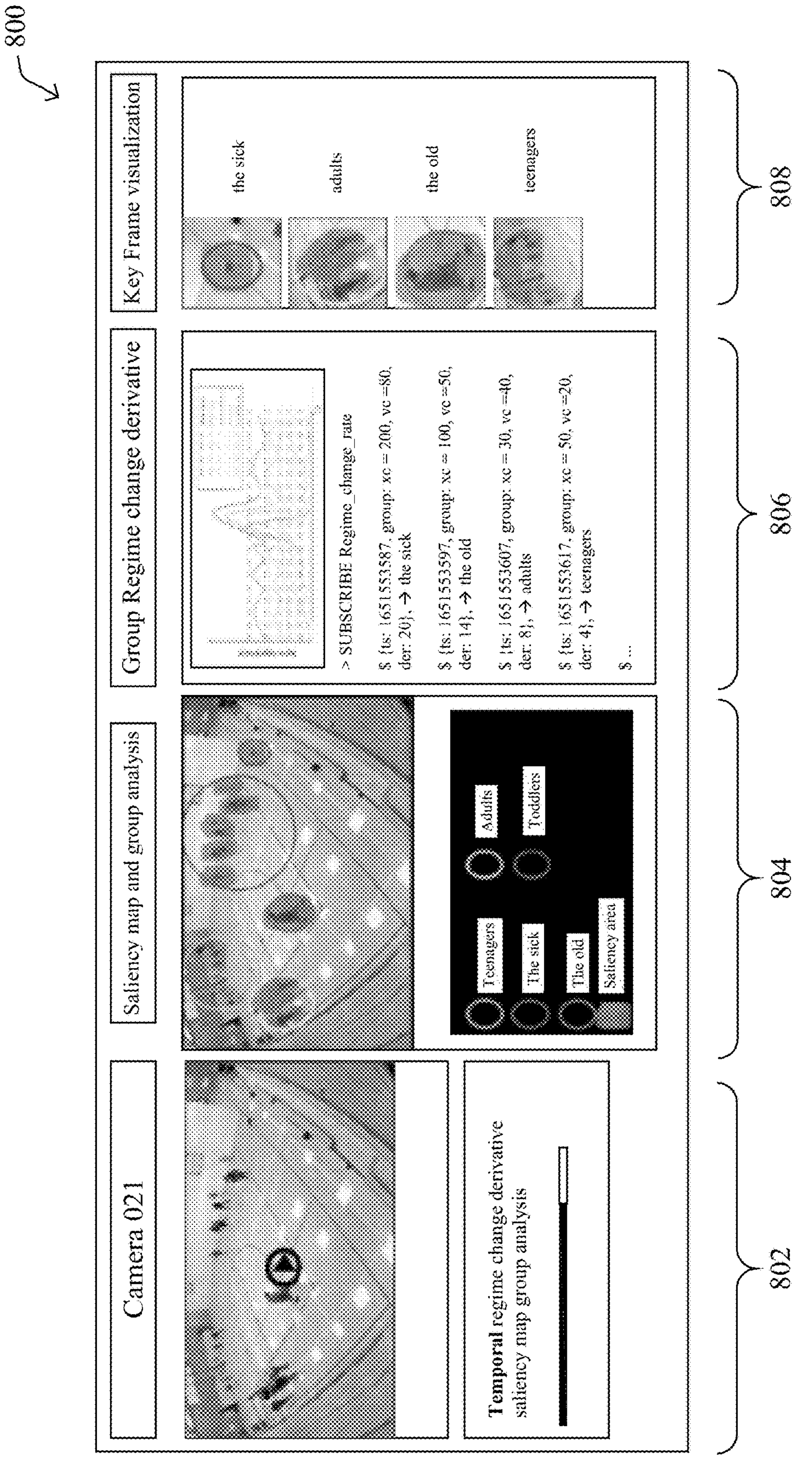
FIG. 8 illustrates an example user interface showing an event alert with contextual information.

FIG. 8 illustrates an example user interface 800 showing an event alert with contextual information raised by video analytics process 248, according to various embodiments. Similar to user interface 600, user interface 800 may present a video clip portion 802 associated with the event, as well as portion 804 with added indicia based on the contextual information for the event. Here, for instance, assume that the different people and groups of people depicted have different demographics.

In various embodiments, user interface 800 may also display visualization data 806 that helps to explain the event to the user. For instance, visualization data 806 may include the computed regime change derivatives for the different objects as well as display data 708, described previously.

In further embodiments, video analytics process 248 may also include focus of attention (FOA) portions 808 of the video data for display by user interface 800 as part of the alert. Such portions 808 may depict the different objects present in the video data, as well as indicia based on the contextual information, such as indicating their different types to the user.

Figure 9:
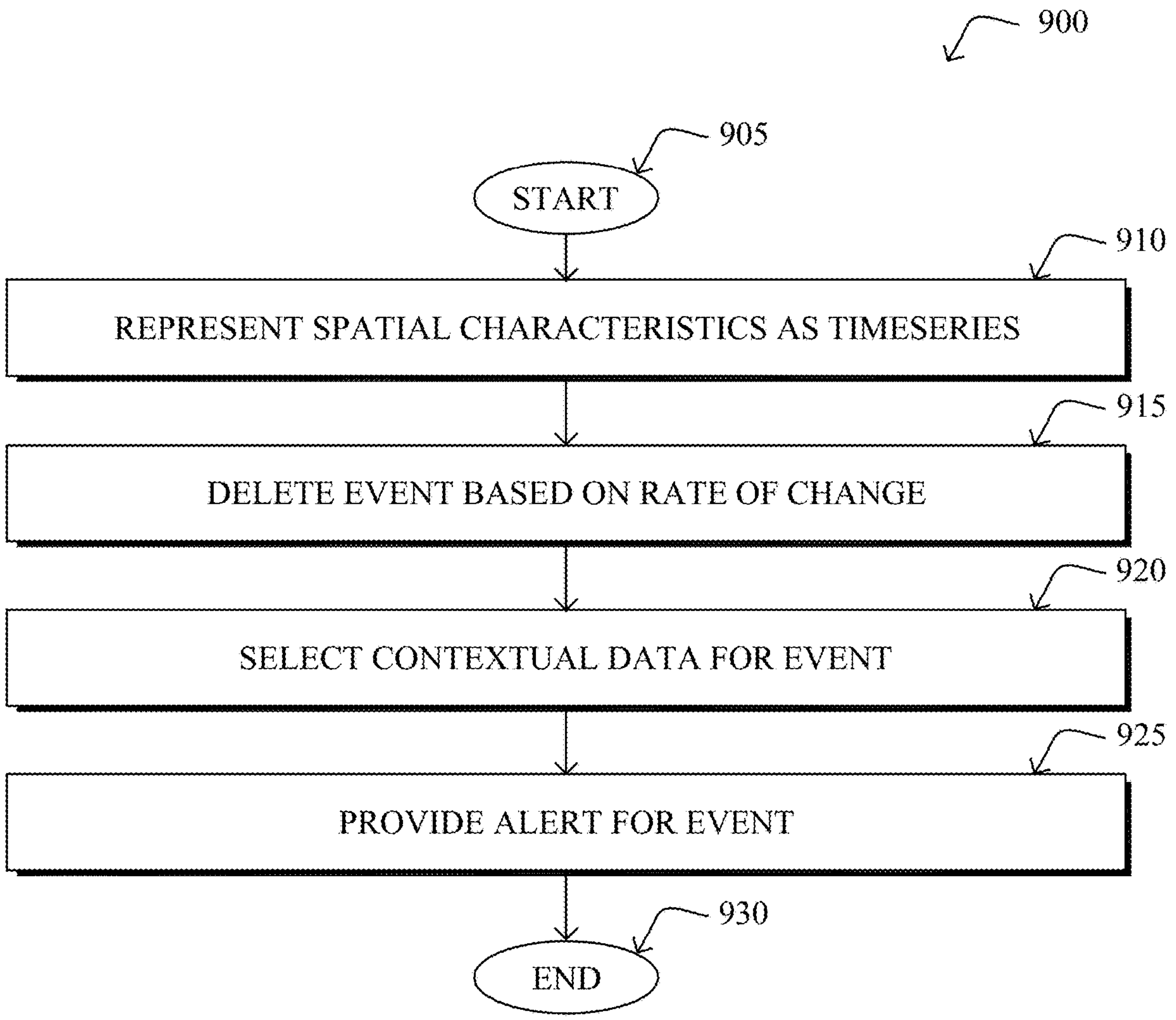
FIG. 9 illustrates an example simplified procedure for providing explainability for event alerts in video data.

FIG. 9 illustrates an example simplified procedure 900 (e.g., a method) for providing explainability for event alerts in video data, in accordance with one or more embodiments described herein. For example, a non-generic, specifically configured device (e.g., device 200) may perform procedure 900 by executing stored instructions (e.g., video analytics process 248). The procedure 900 may start at step 905, and continues to step 910, where, as described in greater detail above, the device may represent spatial characteristics over time of an object in video data as one or more timeseries. In some embodiments, the spatial characteristics comprise a detected centroid of the object. In various embodiments, the object is a person or vehicle. In further embodiments, the object is a cluster of people or vehicles. In one embodiment, the device is an edge device in a network (e.g., a router, switch, etc.).

At step 915, as detailed above, the device may detect an event based on a rate of change of behavioral regimes associated with different portions of the one or more timeseries. In some embodiments, the behavioral regimes are associated with the object performing different actions.

At step 920, the device may select contextual data for the event that comprises spatial timeseries information for different types of objects or different activities, as described in greater detail above. In some embodiments, the different types of objects comprise people having different demographics. In further embodiments, the different types of objects comprise different types of vehicles.

At step 925, as detailed above, the device may provide an alert for the event to a user interface regarding the event that includes the contextual data. In some embodiments, the contextual data includes one or more anomaly thresholds for the different types of objects or different activities. In further embodiments, the alert is based further on the rate of change of transitions between the behavioral regimes of the object and that of one or more other objects in the video data.

Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for explainability for event alerts in video data, it is to be understood that various other adaptations and modifications may be made within the spirit and scope of the embodiments herein. For example, while certain embodiments are described herein with respect to specific use cases for the techniques herein, the techniques can be extended without undue experimentation to other use cases, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

representing, by a device, spatial characteristics over time of an object in video data as one or more timeseries;

detecting, by the device, an event based on a rate of change of behavioral regimes associated with different portions of the one or more timeseries;

selecting, by the device, contextual data for the event, the contextual data comprising spatial timeseries information and data identifying one or more anomaly thresholds for different types of objects or different activities, wherein the one or more anomaly thresholds vary based on at least one of a demographic characteristic of the object or an activity being performed by the object; and providing, by the device, an alert for the event to a user interface regarding the event that includes the contextual data, the contextual data enabling comparison of the rate of change of behavioral regimes against the one or more anomaly thresholds for the different types of objects or different activities.

2. The method as in claim 1, wherein the spatial characteristics comprise a detected centroid of the object.

3. The method as in claim 1, wherein the different types of objects comprise people having different demographics.

4. The method as in claim 1, wherein the different types of objects comprise different types of vehicles.

5. The method as in claim 1, wherein the alert is based further on the rate of change of transitions between the behavioral regimes of the object and that of one or more other objects in the video data.

6. The method as in claim 1, wherein the behavioral regimes are associated with the object performing different actions.

7. The method as in claim 1, wherein the object is a person or vehicle.

8. The method as in claim 1, wherein the object is a cluster of people or vehicles.

9. The method as in claim 1, wherein the device is an edge device in a network.

10. An apparatus, comprising:

a network interface to communicate with a computer network;

a processor coupled to the network interface and configured to execute one or more processes; and a memory configured to store a process that is executed by the processor, the process when executed configured to:

represent spatial characteristics over time of an object in video data as one or more timeseries;

detect an event based on a rate of change of behavioral regimes associated with different portions of the one or more timeseries;

select contextual data for the event, the contextual data comprising timeseries information and data identifying one or more anomaly thresholds for different types of objects or different activities, wherein the one or more anomaly thresholds vary based on at least one of a demographic characteristic of the object or an activity being performed by the object; and provide an alert for the event to a user interface regarding the event that includes the contextual data, the contextual data enabling comparison of the rate of change of behavioral regimes against the one or more anomaly thresholds for the different types of objects or different activities.

11. The apparatus as in claim 10, wherein the spatial characteristics comprise a detected centroid of the object.

12. The apparatus as in claim 10, wherein the different types of objects comprise people having different demographics.

13. The apparatus as in claim 10, wherein the different types of objects comprise different types of vehicles.

14. The apparatus as in claim 10, wherein the alert is based further on the rate of change of transitions between the behavioral regimes of the object and that of one or more other objects in the video data.

15. The apparatus as in claim 10, wherein the behavioral regimes are associated with the object performing different actions.

16. The apparatus as in claim 10, wherein the object is a person or vehicle.

17. The apparatus as in claim 10, wherein the object is a cluster of people or vehicles.

18. A tangible, non-transitory, computer-readable medium storing program instructions that cause a device to execute a process comprising:

representing, by the device, spatial characteristics over time of an object in video data as one or more timeseries;

detecting, by the device, an event based on a rate of change of behavioral regimes associated with different portions of the one or more timeseries;

selecting, by the device, contextual data for the event, the contextual data comprising spatial timeseries information and data identifying one or more anomaly thresholds for different types of objects or different activities, wherein the one or more anomaly thresholds vary based on at least one of a demographic characteristic of the object or an activity being performed by the object; and providing, by the device, an alert for the event to a user interface regarding the event that includes the contextual data, the contextual data enabling comparison of the rate of change of behavioral regimes against the one or more anomaly thresholds for the different types of objects or different activities.

* * * * *